United States Patent [19]
Bertsch et al.

[11] Patent Number: 5,619,392
[45] Date of Patent: Apr. 8, 1997

[54] METHOD AND DEVICE FOR PROTECTING BUSBARS

[75] Inventors: Joachim Bertsch, Bietigheim-Bissingen, Germany; David Peck, Fislisbach, Switzerland

[73] Assignee: Asea Brown Boveri AG, Baden, Switzerland

[21] Appl. No.: 427,588

[22] Filed: Apr. 24, 1995

[30] Foreign Application Priority Data

Jun. 13, 1994 [DE] Germany .......................... 44 20 513.9

[51] Int. Cl.⁶ .................................................. H02H 3/18
[52] U.S. Cl. .............................................. 361/65; 361/87
[58] Field of Search ............................ 361/63, 65, 87, 361/110, 62

[56] References Cited

U.S. PATENT DOCUMENTS 5,367,425  11/1994  Saha et al. ................................ 361/63

FOREIGN PATENT DOCUMENTS 2216377  9/1974  Germany .
4219025A1  12/1992  Germany .

OTHER PUBLICATIONS

"Digitale Filteralgorithmen zur Echtzeit–ermittlung, etc.", T. Lobos, Elektrie, Berlin 46 (1992), pp. 29–34.
"Elektronischer Sammelschienenschutz", H. Haug, et al., Brown Boveri Mitteilungen, Band 53, Nr. 4/5, Apr./May 1966, pp. 326–339.
Schutztechnik in Elektro–energiesystemen, Grundlagen, Stand der Technik, H. Ungrad, et al., 1991, pp. 182–201.

*Primary Examiner*—Jeffrey A. Gaffin
*Assistant Examiner*—Michael J. Sherry
*Attorney, Agent, or Firm*—Burns, Doane, Swecker & Mathis, L.L.P.

[57] ABSTRACT

In a busbar protection method and a corresponding device, the maximum values of the currents in the outgoers are determined. The maximum values Ikmax of the current characteristics are extended by a certain hold time th. Subsequently, these current characteristics are processed further vectorially. With the aid of these current characteristics $\underline{Ik}$ changed in such a way, a fault signal is calculated by means of a protection algorithm, preferably the current comparison method with current stabilization or the phase comparison algorithm. It can be uniquely determined on the basis of the extension of the maximum according to the invention whether an external fault or an internal one is concerned. The advantage of the method and of the device according to the invention resides, in particular, in that the localization of the fault is possible in a reliable fashion even in the case of strong saturation of the current transformers. Above all, false tripping can be reliably avoided even in the case of external faults.

9 Claims, 2 Drawing Sheets

METHOD AND DEVICE FOR PROTECTING BUSBARS

BACKGROUND OF THE INVENTION

1. Field of the Invention

The invention relates to the field of protection. More particularly, the present invention relates to a method and apparatus for protecting busbars.

2. Discussion of Background

Busbar protection systems have been described in the book "Schutztechnik in Elektroenergiesystemen" ("Protection practise in electric power systems") by H. Ungrad et al., Springer Verlag 1991, on pages 182 ff.

In a typical busbar protection system, the currents in the outgoers of the busbar are detected with the aid of current transformers. If, a short-circuit occurs inside or outside the protection zone of the busbar, the resulting high currents occur can cause a magnetic core saturation of the current transformers. This can lead to a malfunction of the busbar protection system. In prior analog busbar protection systems, current transformer saturation was detected and the protection system blocked using analog technology.

However, due to the current transformer saturation, the system described above does not distinguish between an external and an internal fault.

A different approach is disclosed in the INX2 busbar protection system (see Brown Boveri Mitteilungen (Brown Boveri News), Volume 53, No. 4/5, pages 326 to 339) from the BBC company. Here, a voltage proportional to the current is converted into a rectangular signal by means of so-called shapers. One shaper is provided for each half wave of current for both directions. In order to reduce the influence of the current transformer saturation, an integrator is connected downstream of the shapers which holds the digital rectangular signals in their active position during a certain time. As a result of the integrator, for each saturation of a main transformer, even if it is so strong that the current breaks down before the actual zero crossing, the direction of the started half wave is stored until either the measurement is terminated or the next half wave begins. By comparison the directions or phases of the outgoer currents, faults can be detected and to identified as an internal or an external fault.

This system is a very complicated analog system which, in particular, can be used only for the protection algorithm of the phase comparison. Such a system is also described on pages 194 ff of the previously cited textbook.

SUMMARY OF THE INVENTION

Accordingly, one object of the invention is to provide a novel method and apparatus for protecting busbars, in which external and internal faults can be reliably detected and distinguished even under the influence of saturation in the current transformers. The method is numerical and can be used for different protection algorithms.

According to the method of the present invention, the maximum values of the currents in the outgoers are determined and held for a certain hold time.

The current values can be held either at the maximum value or at a value proportional thereto. The current characteristics corrected in such a way are subsequently processed vectorially.

A fault signal is determined from the current characteristics by means of different protection algorithms. Preferably, the protection algorithm includes current comparison with current stabilization and one phase comparison, The device according to the invention includes a field unit per outgoer. The field unit has a maximum value detector and extension means to carry out the method explained above for extending the maximum value.

An advantage of the design according to the invention is that the disturbing influences of the current transformer saturation can be suppressed. The result of this is a functional protection system which is independent of current transformer saturation. In particular, false tripping due to external faults is avoided. In addition, the busbar protection system according to the invention is suitable for different protection algorithms.

BRIEF DESCRIPTION OF THE DRAWINGS

A more complete appreciation of the invention and many of the advantages thereof will be readily obtained by reference to the following detailed description in connection with the accompanying drawings, wherein.

DESCRIPTION OF THE PREFERRED EMBODIMENTS

Figure 3:
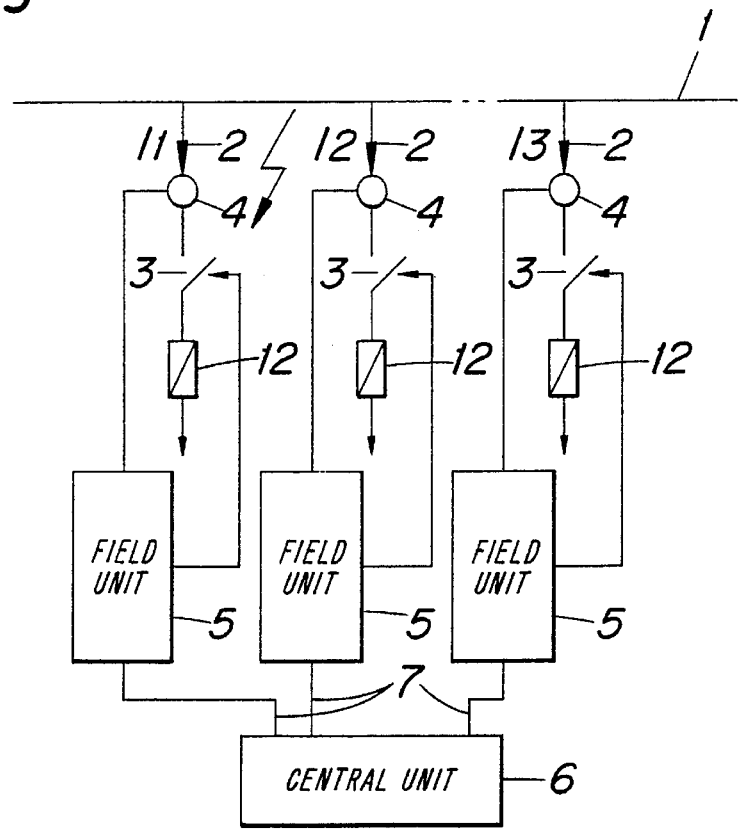
FIG. 3 shows a block diagram of a protection device according to the invention.

Referring now to the drawings, wherein like reference numerals designate identical or corresponding parts throughout the several views, FIG. 3 shows a block diagram of a protection device according to the invention. 1 designates a busbar which has k>=2 outgoers 2 (3 are represented). Each outgoer 2 comprises a load 12, a consumer or a generator, which is connected via a switch 3 to the busbar 1. A current transformer 4 is also provided between the switch 3 and the bar 1.

The current characteristics I1, I2, I3, in general Ik, are determined in the current transformer 4 by the k outgoers 2. If a fault occurs anywhere, such as a short-circuit (indicated by the arrow), the currents Ik increase within a short time and can change direction or phase angle. The aim of the busbar protection is to detach the outgoers 2 as quickly as possible by means of the switches 3 in the case of an internal fault, such as a short-circuit, in the region of the monitored busbar 1, in order to minimize keep damage and operational interruptions.

Since the currents Ik become very large in the case of a fault, magnetic core saturation can occur in the current transformers 4. As a result, the current no longer varies sinusoidally, as represented by dashes in FIGS. 1 and 2, but assumes a maximum and decays again (represented by a continuous line).

To compare the currents of the various outgoers with one another, additional processing of the currents Ik must be performed vectorially. For this purpose, the vectorial fundamental frequency component $\underline{Ik}$ of the currents Ik are determined. This is preferably performed by means of a Fourier filter. However, the current transformer saturation cannot be detected from the fundamental frequency component $\underline{Ik}$, and the influences therefore also cannot be minimized.

In the event of saturation of the current transformers, the phase and amplitude of the fundamental frequency components $\underline{Ik}$ of the currents Ik deviate strongly from the undistorted characteristics. Without additional stabilization, this can lead to false trippings of the protection system. The object of the method and apparatus according to the invention is to stabilize the current values.

Figure 1:
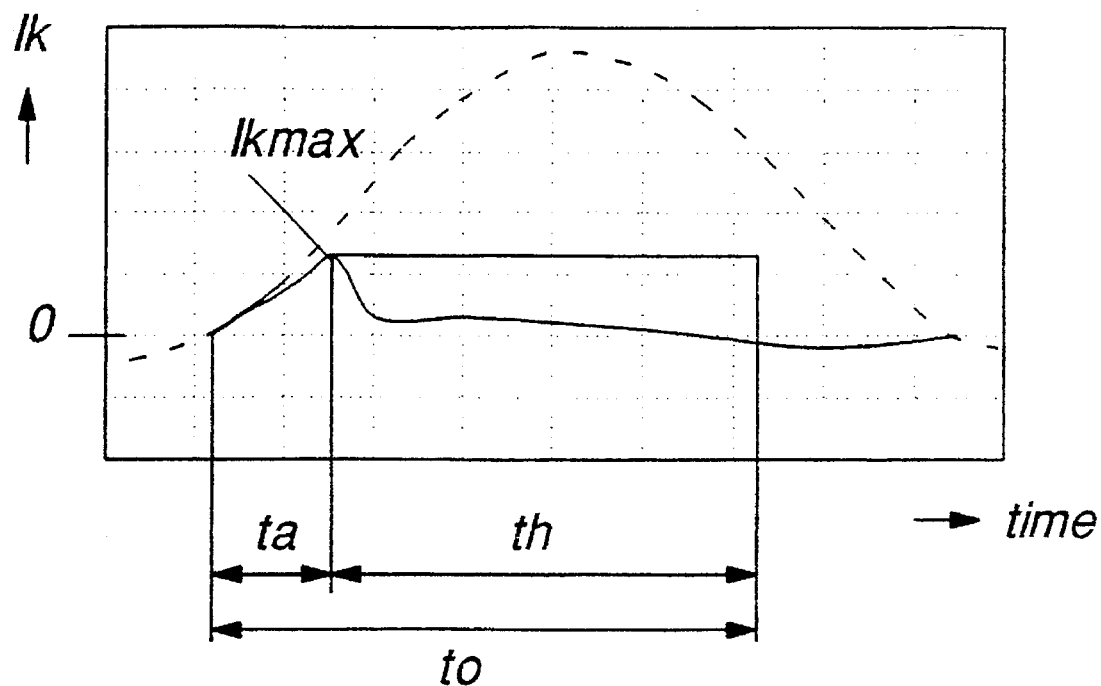
FIG. 1 shows the time characteristic of an undistorted outgoer current signal and of an outgoer current signal distorted by current transformer saturation, as well as the extension of the maximum value according to the invention.

This is achieved by determining the maximum Ikmax of the outgoer currents Ik and maintaining this maximum Ikmax for a certain hold time th (see FIG. 1). If this method is performed for numerical busbar protection before determination of the fundamental frequency component $\underline{Ik}$, the influence of the current transformer saturation on the protection system can be substantially reduced.

Figure 2:
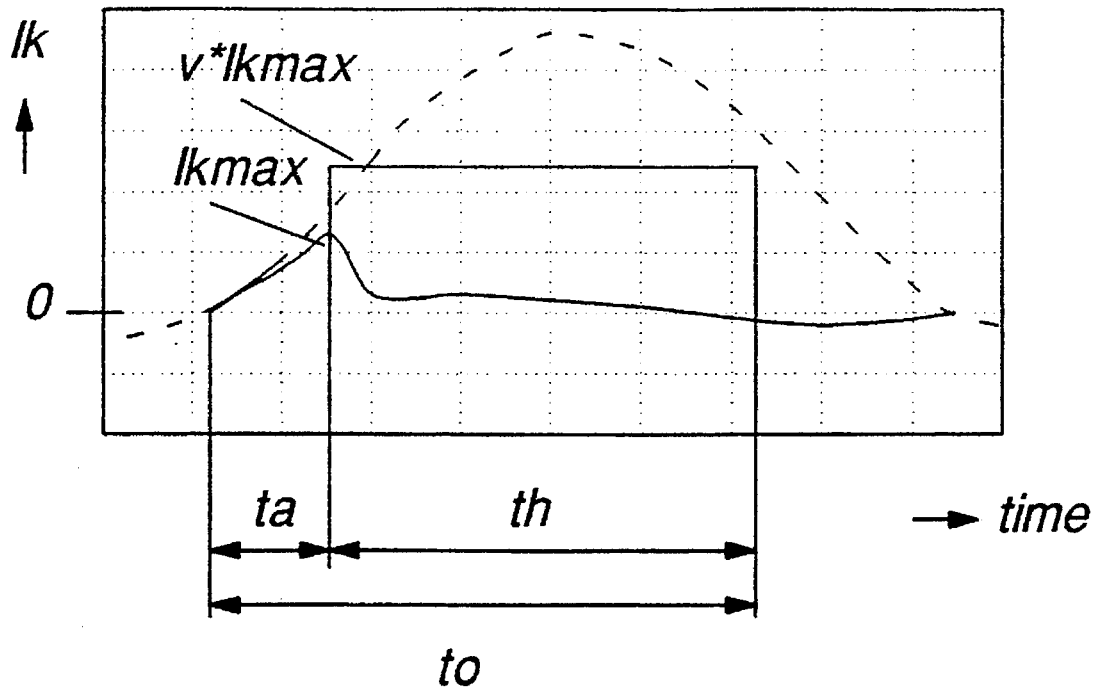
FIG. 2 shows the time characteristic of an undistorted outgoer current signal and of an extended outgoer current signal distorted by current transformer saturation, as well as the extension and overshooting of the maximum value according to the invention.

To maintain the maximum Ikmax, the current value can be held either at its maximum value Ikmax ("simple maxima extension", FIG. 1) or at a value proportional thereto ("dynamic maxima extension", FIG. 2).

For both variants, the hold time th is calculated as the difference between a maximum hold time $t_o$ (externally prescribed) and the instant of the occurrence of the maximum ta. Experiments have shown that the optimum maximum hold time to in a 50 Hz system is 12.5 ms. If a valid maximum Ikmax has been detected, this value is held during the period th, with the result that a rectangular signal is produced.

In the case of the dynamic maxima extension, the maximum value Ikmax is held at a value proportional thereto. The proportionality factor v is calculated using the formula $$v = \frac{1}{\sin\left(\frac{2\pi ta}{To}\right)}$$

where ta corresponds to the instant of the occurrence of the maximum Ikmax, and To corresponds to the period of the system frequency.

After the extension of the maximum values in accordance with the method described above, the current characteristics Ik are vertically processed, that is to say only the fundamental frequency component $\underline{Ik}$ is taken into account.

Two preferred protection algorithms are addressed below, by means of which it is possible to generate a fault signal from the current characteristics $\underline{Ik}$.

A stabilization factor kst is calculated in the case of current comparison methods with current stabilization, kst corresponding to the quotient of the geometrical sum of the current characteristics and the arithmetic sum of the current characteristics. Expressed by formulae:

$$kst = \frac{|\Sigma \underline{Ik}|}{\Sigma |\underline{Ik}|}$$

$k = 1 \ldots$ number of outgoers
$Ik$ = current characteristic in outgoer $k$.

In the case of an internal fault, kst reaches at most the value 1, while in the case of an external fault it reaches the minimum value of zero. It is possible to distinguish between an external fault and an internal one with the aid of a threshold value. In the case of methods without maxima extension, the regions of kst for an internal fault or an external one overlap, with the result that no unambiguous distinction is possible. A measure of how clearly internal faults can be distinguished from external ones is the difference dkst between the minimum kst factor for internal faults and the maximum kst value for external faults.

Listed in the following tables are values which were obtained during experiments, showing the advantage the method according to the invention confers with respect to distinguishing internal and external faults.

| Method | dkst | max. kst for ext. faults | min. kst for int. faults |
|---|---|---|---|
| without maxima extension | −0.12 | 0.91 | 0.79 |
| simple maxima extension | 0.17 | 0.79 | 0.96 |
| dynamic maxima extension | 0.35 | 0.61 | 0.96 |

In the case of the method without maxima extension, the result is a negative dkst (that is to say, the ranges of kst for external and internal faults overlap and an error-free distinction is not possible). In the case of dynamic maxima extension, dkst is approximately twice as large as in the case of simple maxima extension. The dynamic method is thus clearly more robust and substantially less sensitive with respect to saturation influences.

A second, preferred protection algorithm is the phase comparison algorithm. In this case, the current direction is determined with the aid of the phase angle φk from the current characteristics $\underline{Ik}$ of the individual outgoers. It can now be decided from the differences in the phase angles φk whether an external or an internal fault is present. In the case of a system having two outgoers, an internal fault is present if the absolute value of the phase difference of the currents is smaller than π/2. If the absolute value of the difference is greater than this value, the fault is external.

Figure 4:
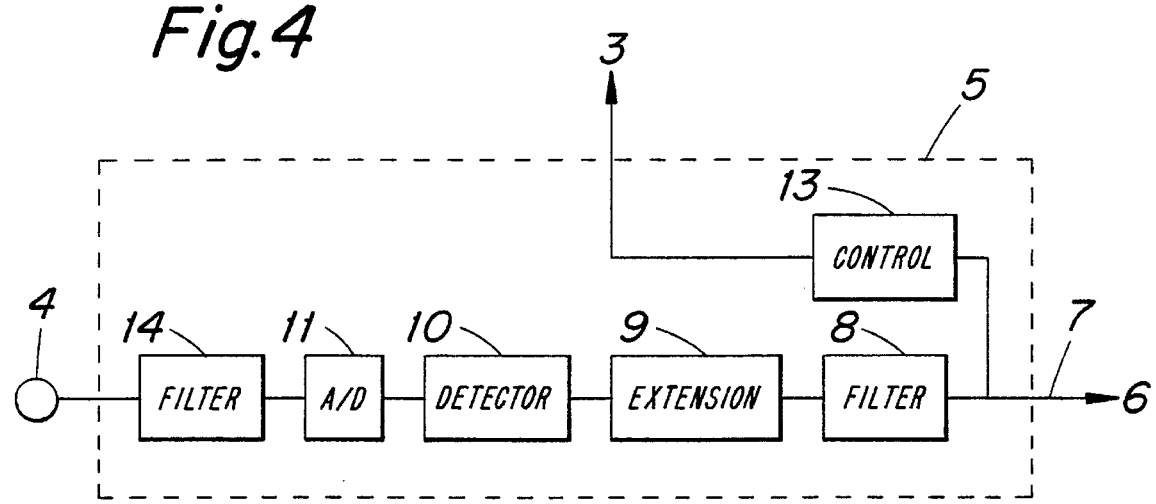
FIG. 4 shows a block diagram of a section of the field unit.

In conclusion, it is further explained with the aid of FIGS. 3 and 4 which devices are required for a protection system according to the invention. Three outgoers 2, for example, in which the currents I1 . . . I3 flow, branch off from a busbar 1. These current characteristics, in general IK, are detected in the current detecting means. The current detecting means can, for example, comprise a current transformer 4 and an A/D converter 11. The A/D converter is provided for each outgoer 2 in a field unit 5 and connected to the corresponding current transformer 4. Connected upstream of the A/D converter 11 is a low-pass filter 14 which acts as an anti-aliasing filter. Connected downstream of the A/D converter 11 is a maximum value detector 10 in which the maximum value Ikmax is determined. This value is held in the extension means 9 during the hold time th. It is preferable to connect downstream of the extension means 9 a Fourier filter 8 to determine the vectorial fundamental frequency component $\underline{Ik}$. The current characteristics $\underline{Ik}$ thus prepared are fed by the field units 5 via a process bus 7 to a central unit 6 in which the fault signal is determined according to one of the protection algorithms presented above. The field units 5 are instructed via the process bus 7 by the central unit 6 to open the switches 3 when an internal fault is present. This is performed by means of a control unit 13 provided in each field unit 5.

The invention thus makes available overall a method and a device for protecting busbars, which, independently of saturation phenomena in the current transformer, can reliably detect and distinguish external and internal faults and, in addition, can be used for different protection algorithms.

Obviously, numerous modifications and variations of the present invention are possible in light of the above teachings. It is therefore to be understood that such modifications do not depart form the invention if within the scope of the appended claims.

What is claimed as new and desired to be secured by Letters Patent of the United States is:

1. A method for protecting busbars having multiple outgoers, comprising the steps of:

determining current characteristics of the outgoers;

determining a fault signal using a vectorial representation of the current characteristics;

determining a value representative of a maximum current characteristic; and maintaining the representative value for a hold time $t_h$, wherein the hold time $t_h$ is calculated as $t_h = t_o - t_a$, $t_a$ corresponding to the instant of the occurrence of the maximum current characteristic, and $t_o$ corresponding to an externally-defined maximum hold period.

2. The method as claimed in claim 1, wherein the representative value is proportional to the corresponding maximum current characteristic.

3. The method as claimed in claim 2, wherein the representative value is calculated by multiplying the maximum current characteristic by the factor $$v = 1/\sin(2\pi t_a/T_o)$$

wherein $t_a$ corresponds to the time of the occurrence of the maximum current characteristic, and $T_o$ corresponds to a fundamental system frequency period.

4. The method as claimed in claim 1, wherein the fault signal is a stabilization factor which corresponds to a quotient of a geometrical sum of the vectorial representations and an arithmetic sum of the vectorial representations.

5. The method as claimed in claim 4, wherein the stabilization factor is Used to determine whether an internal fault or an external fault is present, such that when the stabilization factor is less than a lower limiting value, an external fault is present and, when the stabilization factor exceeds an upper limiting value, an internal fault is present.

6. The method as claimed in claim 1 wherein a phase value is determined from the vectorial representations and is used to determine whether an internal fault or an external fault is present.

7. The method as claimed in claim 1, wherein a Fourier filter is used to determine the vectorial representations.

8. A device for protecting a busbar having multiple outgoers, each connected to the busbar through a switch, comprising:

a current detecting device for each outgoer for detecting current characteristics;

a field unit for each outgoer, each field unit being connected to a switch so as to open the switch in response to a fault signal;

a central unit connected via a process bus to each of the field units, the central unit determining the fault signal from vectorial representations of the current characteristics;

the field units including extension means and maximum value detectors which determine a maximum value of the characteristics and maintain the maximum value for a hold time $t_h$ calculated as $t_h = t_o - t_a$, $t_a$ corresponding to an instant of occurrence of the maximum value, and $t_o$ corresponding to an externally-defined maximum hold period.

9. The device as claimed in claim 8, wherein a Fourier filter is provided in each field unit for determining the vectorial current representations, the filter being connected downstream of the extension means.

* * * * *